United States Patent [19]
Blainey et al.

[11] Patent Number: 5,787,284
[45] Date of Patent: Jul. 28, 1998

[54] IMPROVING MEMORY LAYOUT BASED ON CONNECTIVITY CONSIDERATIONS

[75] Inventors: Robert James Blainey, Newmarket; Christopher Michael Donawa; James Lawrence McInnes, both of Toronto, all of Canada

[73] Assignee: International Business Machines Corporation, Armonk, N.Y.

[21] Appl. No.: 726,038

[22] Filed: Oct. 7, 1996

[30] Foreign Application Priority Data

Dec. 28, 1995 [CA] Canada ................... 2166254

[51] Int. Cl.$^6$ ................... G06F 9/45
[52] U.S. Cl. ................... 395/701; 395/705; 395/707; 395/708; 395/709
[58] Field of Search ................... 395/705, 707, 395/708, 709, 701

[56] References Cited

U.S. PATENT DOCUMENTS

| | | | |
|---|---|---|---|
| 5,107,418 | 4/1992 | Cramer et al. | 395/709 |
| 5,193,190 | 3/1993 | Janczyn | 395/707 |
| 5,367,683 | 11/1994 | Brett | 395/700 |
| 5,428,793 | 6/1995 | Odnert et al. | 395/709 |
| 5,485,616 | 1/1996 | Burke et al. | 395/709 |
| 5,530,866 | 6/1996 | Koblenz et al. | 395/708 |
| 5,555,417 | 9/1996 | Odnert et al. | 395/707 |
| 5,579,520 | 11/1996 | Bennett | 395/704 |
| 5,606,697 | 2/1997 | Ono | 395/707 |

FOREIGN PATENT DOCUMENTS 2102088 10/1993 Canada ................... G06F 9/44

OTHER PUBLICATIONS

Chow, "Minimizing register usage penalty at procedure calls", Proc. of the SIGPLAN, '88 Conf. on Programming Language Design & Implementation, pp. 85–94, Jul. 1988.

Wall, "Global register allocation at link time", Proc. of the SIGPLAN, SIGPLAN notices, vol. 21, No. 7, pp. 264–275, Jul. 1986.

Lomet, "Data flow analysis in the presence of procedure calls", IBM Research & Development, USA, vol. 21, No. 6, pp. 559–571, Nov. 1977.

Hwu et al. "Checkpoint repair for high–performance out–of–order execution machines", IEEE Trans. on Computers, vol. C–36, No. 12, pp. 1496–1514, Dec. 1987.

Cooper et al. "Impact of interprocedural analysis and optimization in the R.sub.n programming environment," ACM Trans. Programming Language & Syst., vol. 8, No. 4, pp. 491–523, Oct. 1986.

Richardson, "Code optimization across procedures", IEEE Comput. Soc., vol. 22, No. 2, pp. 42–50, Feb. 1989.

K.M. Gilbert, Effective Register Management During Code Generation, IBM Technical Disclosure Bulletin, vol. 15, No. 8, Jan. 1973, pp. 2640–2645.

K. O'Brien et al, Advanced compiler Technology for the RISC System/6000 Architecture, IBM RISC System/6000 Technology, pp. 154–161, 1990.

*Primary Examiner*—Edward R. Cosimano
*Assistant Examiner*—Cuong H. Nguyen
*Attorney, Agent, or Firm*—Baker Maxham Jester & Meador

[57] ABSTRACT

A technique used during interprocedural compilation in which program objects are grouped together based on the weights of the connections between the objects and their costs. System-imposed constraints on memory size can be taken into account to avoid creating groupings that overload the system's capacity. The groupings can be distributed over memories located on different processors.

4 Claims, 7 Drawing Sheets

IMPROVING MEMORY LAYOUT BASED ON CONNECTIVITY CONSIDERATIONS

BACKGROUND OF THE INVENTION

1. Field of the Invention

The present invention is directed to a general purpose algorithm used during interprocedural compilation that implements the discovery that program objects can be effectively grouped together based on the weightings of the connections between the objects and their costs. Two particular applications of this invention in the area of instruction locality and global variable coalescing form the subject matter of our two concurrently filed applications, U.S. Ser. No. 08/726,039, filed Oct. 7, 1996 and U.S. Ser. No. 08/727,720, filed Oct. 7, 1996. (IBM Docket Nos. CA9-95-020 and CA9-95-021)

2. Description of the Related Art

Compilation is the process that translates source code, written in a high-level, human-readable programming language, into the binary notation called object code capable of machine implementation. Modern day compilers include optimizing techniques directed at eliminating redundancies and unused code, and at maximizing the efficient use of the hardware resources of the computer.

Interprocedural analysis (IPA) is a 2-pass compilation procedure developed by IBM and used in its XL compilers. IPA is described in detail in Canadian Patent Application No. 2,102,089 (IBM Docket No. CA9-93-016) commonly assigned. The first IPA pass is performed at compile time and collects summary information that is written to the object file for each procedure compiled. This summary information includes a list of all callsites in each procedure, alias information for each procedure and information on the extent of use of registers. The information on the extent of register use is called register pressure or colouring information.

The second IPA pass is an information dissemination pass performed at link time when all files in the application have been compiled. The IPA driver reads the summary information from the object files and computes the application's "call multigraph" or "callgraph", a graph illustrating all of the procedures in the program and the calls between them. A call graph consists of a number of nodes, each of which represents a procedure in the program. The nodes are interconnected by edges, and each of the edges has a direction. The edges represents procedure or method calls between the nodes or procedures. The information collected from the IPA, or from any of the multiple compilation passes, is used for improving the structure of the code to be produced in the program executables.

For example, U.S. Pat. No. 5,428,793 titled "Method and Apparatus for Compiling Computer Programs with Interprocedural Register Allocation" to Hewlett Packard Company describes an optimization technique called "spill code motion" that facilitates the reduction of the overhead associated with saving and restoring so-called "callee-saves" registers. The program analyzer used in connection with a program compiler identifies clusters of nodes in the program callgraph. The basis for determining whether a "cluster" exists is to identify, from profile information collected during a first compiler pass, a unique root node through which every other node in the cluster can be called. Interprocedural machine registers are then assigned to each cluster node, and the root node of each cluster is designated to execute machine instruction to preserve the values of the interprocedural registers assigned to nodes of that cluster, and so that other nodes within the cluster need not execute the machine instructions. In register spill optimization, callee-saves register spill is moved upwards in the callgraph so that descendent nodes may use them without the overhead associated with interprocedural calls. Therefore the motivation for partitioning is one the basis of data sharing.

In addition to using the information collected during the information gathering pass of analyzing execution calls, the collected information includes data dependencies, and these can be analyzed for use by the compiler during code optimization. U.S. Pat. No. 5,107,418, titled Method for Representing Scalar Data Dependencies for an Optimizing Compiler of Supercomputer Systems Limited, discusses a method for constructing a scalar dependence graph of a program that represents all of the local and global scalar data dependencies. The information in the constructed graph can then be used by the compiler for implementing all types of optimizations, including scheduling, register allocation, loop invariant expression identification, array dependence graph construction, etc.

The present invention also makes use of the information collected during IPA, and the resulting construction of a weighted callgraph representing a specific category of program objects and the relationships between them.

SUMMARY OF THE INVENTION

The present invention provides a method for optimizing memory layout of program objects in which the access connections between program objects are weighted and the size or cost of the program objects determined during compilation. Aggregates of the program objects are built for the larger weighted connections before the smaller weighted connections, the size of the groups being limited by a maximum aggregate cost. Code based upon the newly built aggregate groups is generated in order to map the groups to memory. The groups may also map to communicating modules on a distributed network of disjoint memories/machines.

In particular, the invention provides a method for optimizing memory layout following compilation that consists of the steps of identifying referenced program objects, building a weighted interference graph in which the weights and the nodes represent program object size and the weights on the edges represent access relationships between the nodes, grouping the heaviest edges together from the weighted interference graph while the total weight of the nodes does not exceed a preset limit, and remapping the program objects based on the grouping.

The present invention is also directed to a computer program product that comprises a computer usable medium having new, useful and nonobvious combination of computer readable program code means embodied therein. The computer readable program means causes a computer to effect the above described methods.

BRIEF DESCRIPTION OF THE DRAWINGS

Embodiments of the invention will now be described in detail in association with the accompanying drawings in which.

DETAILED DESCRIPTION OF THE PREFERRED EMBODIMENTS

Figure 1:
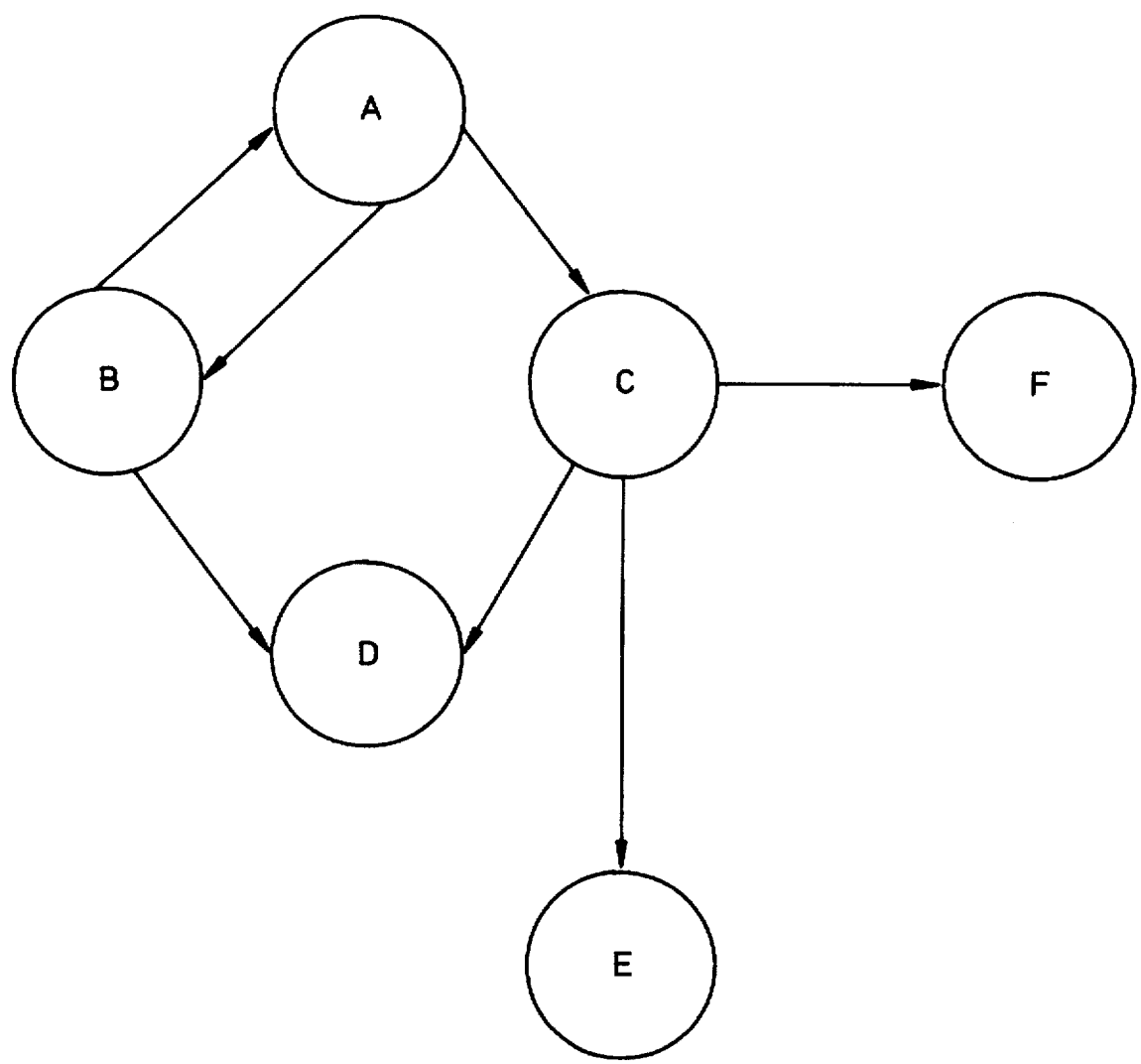
FIG. 1 is a caligraph showing interprocedural calls within a program.
Figure 2:
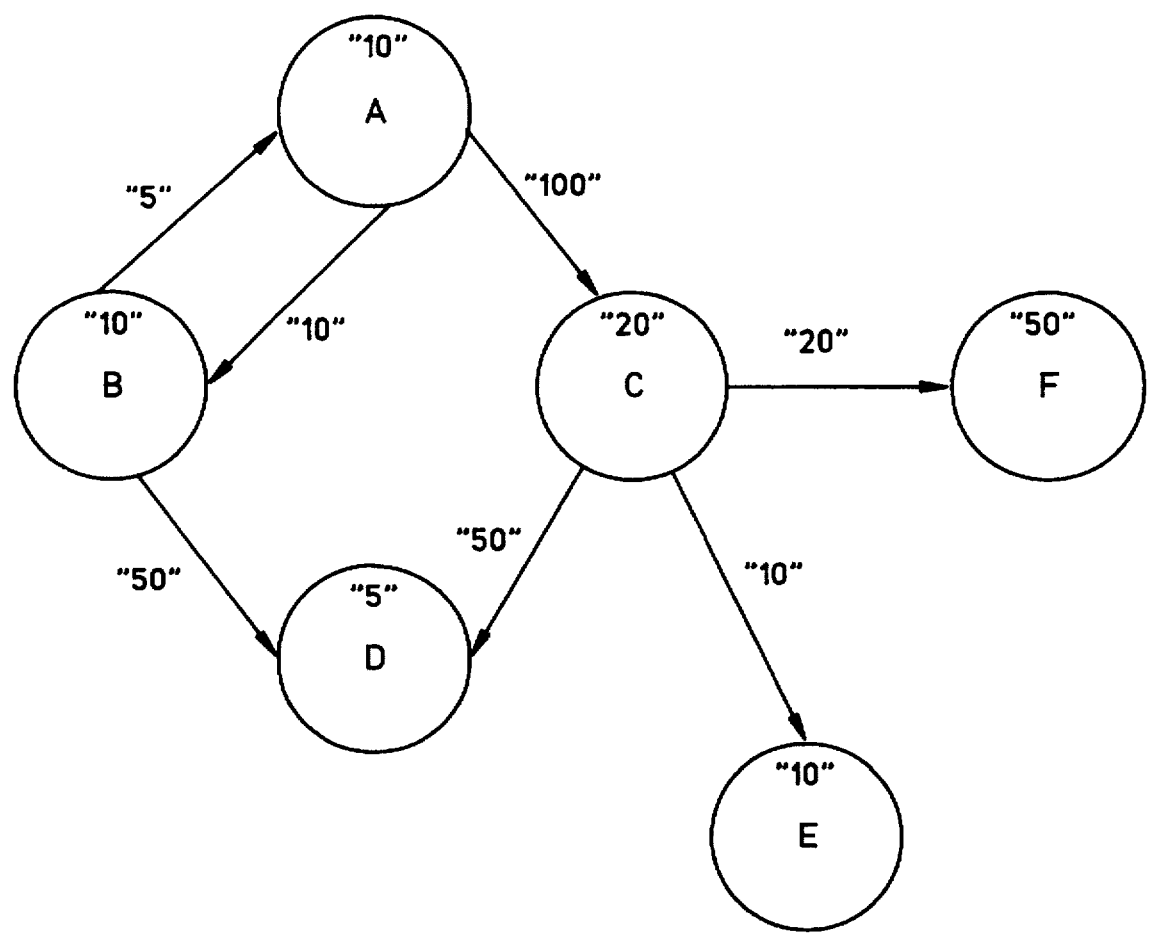
FIG. 2 is the callgraph of FIG. 1 with values representing weights on the edges and nodes of the callgraph.

FIG. 1 shows a simple callgraph constructed from information gathered during interprocedural analysis or IPA. This program consists of six procedures. A and B call each other; A also calls C and B also calls D. C calls D, E and F. By applying heuristics (information also gathered during IPA compilation) or actual profile information to the call graph of FIG. 1, the "weightings" of the edges between the procedures can be determined and this is illustrated in FIG. 2. The "weight" of an edge between two procedures could represent the execution count, that is the number of times that one procedure calls another. Under this analysis, procedure A calls B 10 times in this program, while B calls A only five times. By contrast, procedure A calls C 100 times. Alternatively, the weight on the edge could be an estimated weight based on profiling each one of the nodes.

As can be seen from FIG. 2, each node also has a weight associated with it. This can be an estimate based on the size (or number of lines) of the code.

Figure 3:
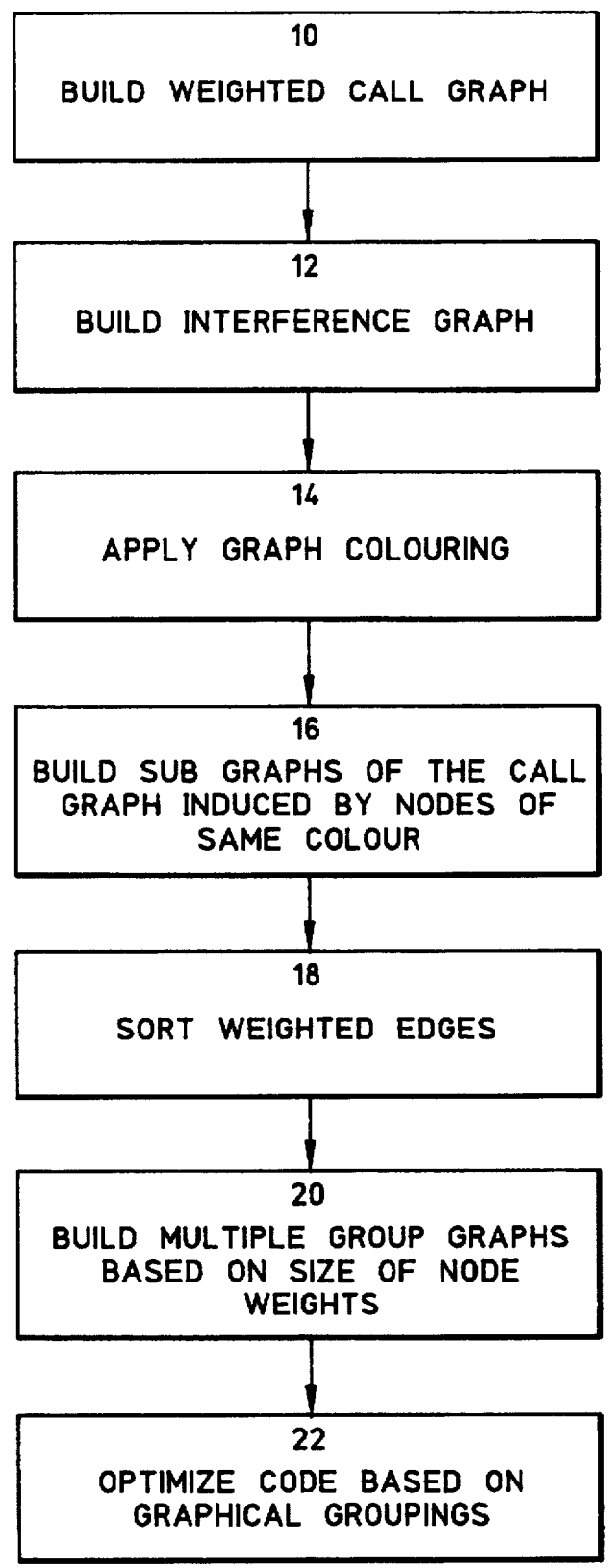
FIG. 3 is a flow diagram showing the steps for program partitioning, according to one application of the invention.
Figure 4:
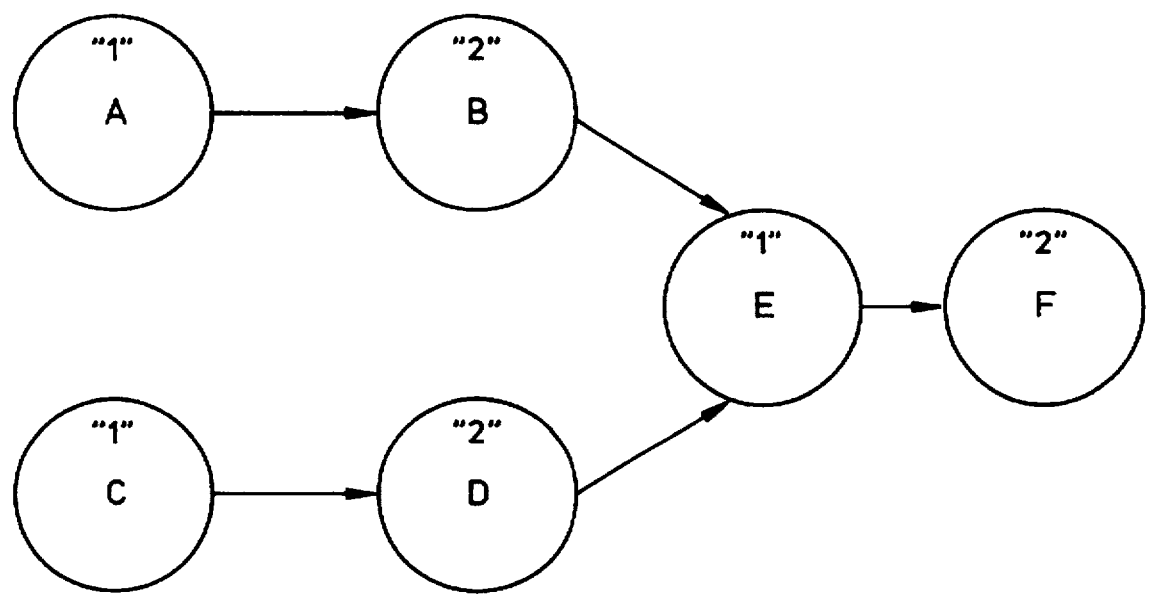
FIG. 4 is a coloured interference graph of the callgraph of FIGS. 1 and 2.

Using the information derived from IPA of the application during compilation, the application of the invention directed to instruction locality is illustrated in the flow diagram of FIG. 3 beginning at block 10. The callgraph of FIGS. 1 and 2 is built using the information gathered for optimization as described above. From the callgraph, each node is extracted and used to build an interference graph (block 14). The edges between the nodes in the interference graph represent conflict between the nodes, and where there are no edges between nodes, there are no conflicts for whatever reasons (e.g. options, etc.). An interference graph for the callgraph of FIGS. 1 and 2 is illustrated in FIG. 4. "Graph colouring" is applied to the interference graph (block 16). This is a procedure of applying a minimum number of colours (or numbers, as illustrated in FIG. 4) to each of the nodes so that no two nodes joined by an edge have the same colour or number.

Figure 5A:
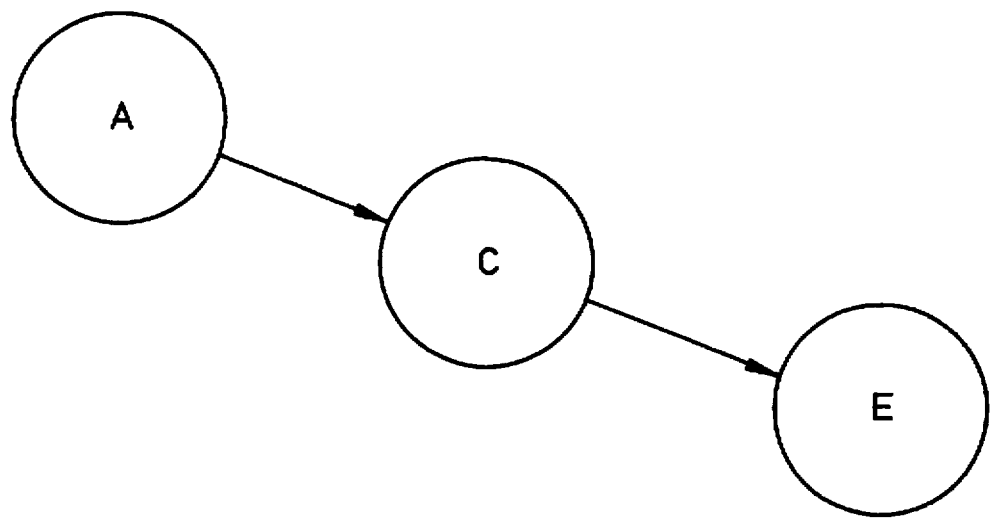
FIG. 5, consisting of FIGS. 5A and 5B, are subgraphs of the callgraphs of FIGS. 1 and 2.
Figure 5B:
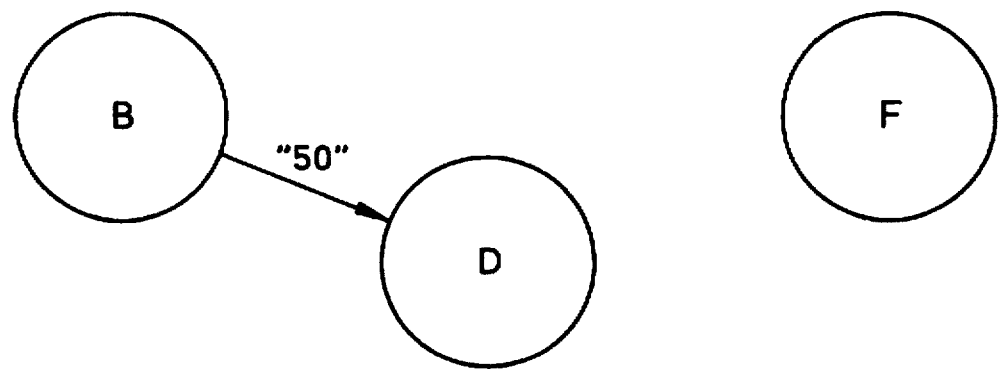

From the coloured interference graph, sub-graphs of the callgraph are built induced by nodes of the same colour (block 18). From the coloured interference graph of FIG. 4, two valid subgraphs are induced, as shown in FIGS. 5A and 5B. In FIG. 5A, the sub-graph consists of procedures A, C and E. In FIG. 5B, the sub-graph, consisting of procedures B, D and F, shows F as disconnected because in the original callgraphs of FIGS. 1 and 2, F is not directly called by either procedure B or D.

The sub-graphs show the grouping of procedures that could be combined into modules. However, when partitioning program procedures, the purpose is to pass on to the next stage of compilation, pieces of code that are of significant size, but that are not so large as to exceed compilation capacity for that platform. Therefore, this invention provides a further optimization procedure to maximize the size of each grouping passed while remaining within the system or user defined limits.

In FIG. 2, values called "weights", representing the execution count between procedures, were added to the edges. These weights now come to symbolize the desirability of processing procedures together within partitions, subject to system-dependant or user defined constraints, such as memory size. To appropriately group interacting procedures together, a process is employed that is somewhat derived from the algorithm for computing the maximal spanning forest of a directed graph.

To compute a maximal spanning forest, the edges from a weighted graph are sorted from highest to lowest weight. Spanning trees are created by adding edges to groups, except where the addition of an edge would create a cycle. In a maximal spanning forest, the spanning trees cannot exceed a pre-set size.

In this preferred embodiment of the present invention, the weighted edges from the originally weighted callgraph (FIG. 2) are sorted from highest to lowest weight (block 20 in FIG. 3), to yield the following hierarchy:

A→C (Edge weight=100)

B→D (Edge weight=50)

C→D (Edge weight=50)

C→F (Edge weight=20)

A→B (Edge weight=10)

B→A (Edge weight=5)

Multiple group graphs, based on the pattern of the disjoint sub-graphs (FIGS. 5A and 5B) are built. To avoid violating imposed constraints on module size with any one group, the basis for limiting group size is the sum of the node weight of the procedures to be included in a single partition (block 22 of FIG. 3).

If a system-imposed limit of 40 is assumed in the case of the example illustrated in FIGS. 2 and 5, procedure A calling procedure C would be the start of one group graph with a cost of 30. Procedure C calling the group graph including procedure B and procedure D cannot be added to this group because of the additional node weight of 15 yield a total of 45, exceeding the imposed limit of 40. Similarly, the edge between C calling F cannot be added without again, exceeding the limit.

The second major grouping is based on procedure B calling procedure D, with the total node weight of 15. Procedure F will not be added into this sub-group because, as shown in FIG. 5B, it is disjoint. By contrast, the spanning forest algorithm need not be concerned with conflict constraints since it is run only on subgraphs which are guaranteed (by colouring) to be conflict-free.

The result of the use of this optimization technique is that components that call each other frequently within the program are partitioned together into the same groupings. This allows subsequent components to optimize these frequently called edges (e.g. register optimization). The heavy edges are optimized and the light edges become module entry points and external calls.

A further application of the general algorithm of the present invention is used to rearrange external storage in order to maximize data locality. The first advantage of this optimization is that a number of separate small data objects are brought together. Secondly, the data objects are ordered so that those used together most frequently are grouped together. This aspect of the invention is particularly useful in optimizing programs in languages such as C and C++ that have a proliferation of small data objects.

Figure 6:
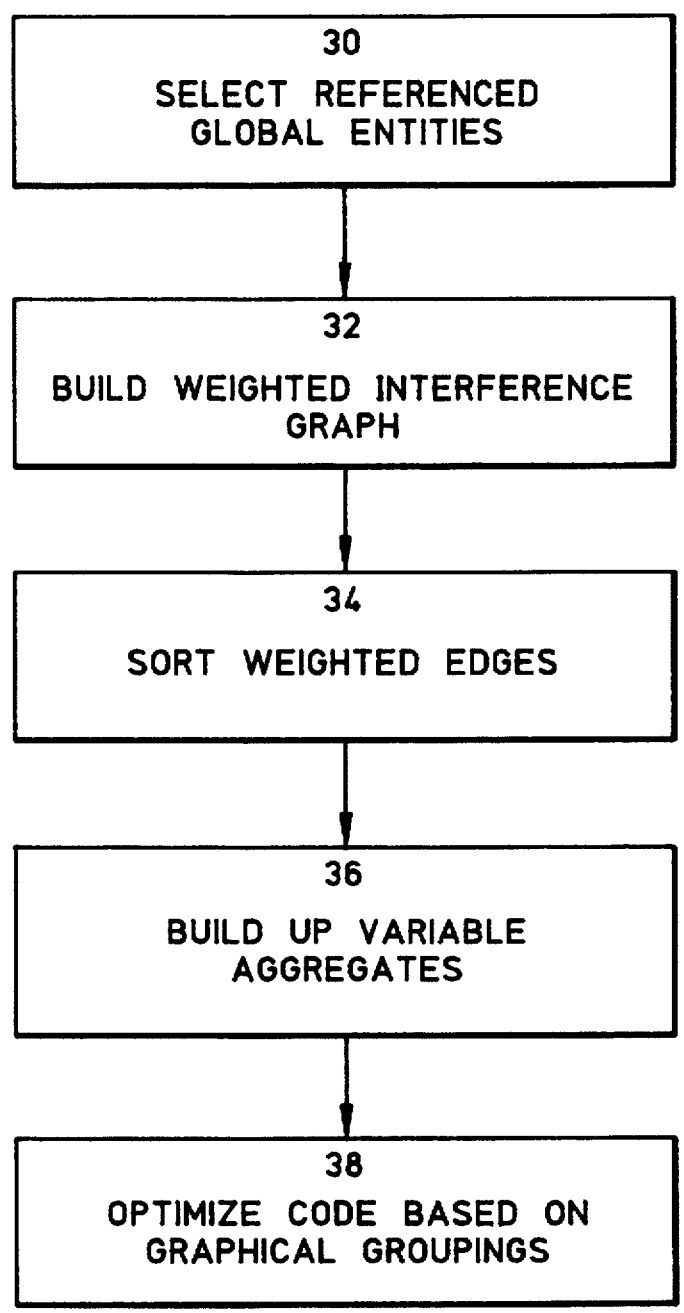
FIG. 6 is a flow diagram showing the steps for aggregating global variables according to another application of the invention.

The method of this application is set out in FIG. 6. A number of global variables are selected. This includes members of global structures which are taken as separate entities. Only those variables that are referenced are selected; unreferenced variables are discarded (block 30).

A weighted interference graph is constructed on the selected variables (block 32). From the following listing of data objects, a weighted interference graph as illustrated in FIG. 7 can be constructed:

```
int z [100]
struct a {
    .
    .
    .
    dbl s
    dbl t
}
int x;
int y;
```

Certain variables are excluded from the weighted interference graph. Variables that may be referenced by the invisible portion of the program cannot be included because references to such variables are based on their original names and, following variable aggregation, these names will no longer access them.

Figure 7:
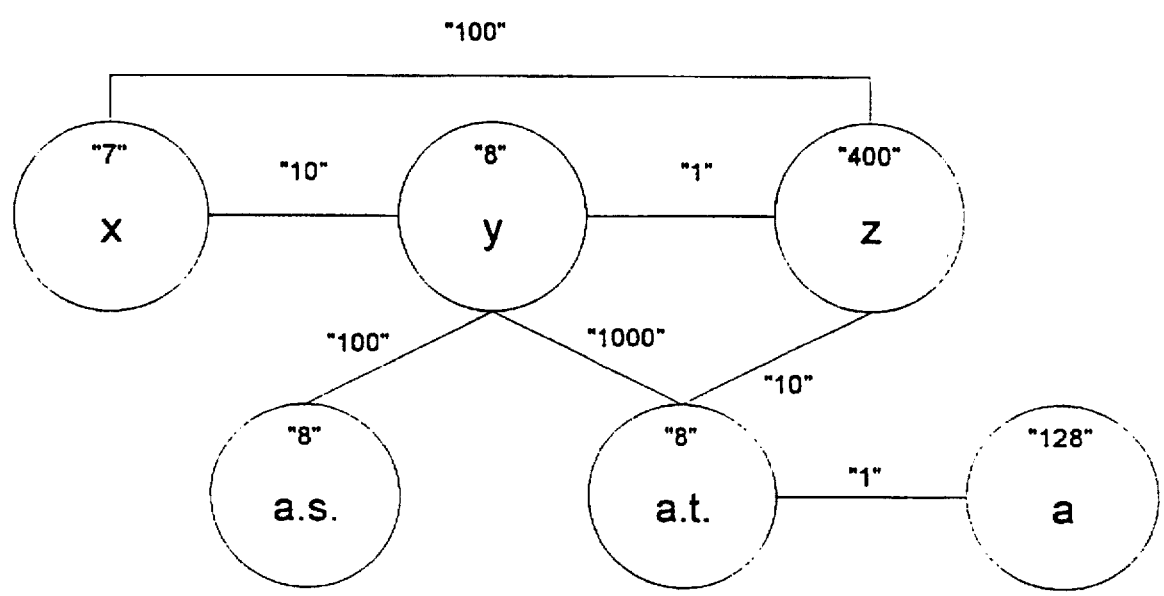
FIG. 7 is a weighted interference graph of global variables according to the application illustrated in FIG. 6.

An edge between variables in FIG. 7 means that the variables are used together in the same procedure or in the same control region. The weightings on the edges is a measure of affinity, indicating how often the two variables are accessed together across the whole program and in what context. For example, if two variables are used together inside a single nesting of a loop, then the edge between them is weighted 10. If they are inside two nestings of a loop, the weighting is 100. If these procedures were used inside two procedures, doubly-nested, then the weighting on the edge between them would be 200.

While it is desirable to bring together in memory data objects that will be frequently accessed together, like the earlier described embodiment of instruction locality, global variable locality is also subject to a size limitation in the register capacity.

As described above in relation to instruction locality, the edges between the global variables are sorted by weight from heaviest to lightest (block 34 of FIG. 6). This results in an ordering of the global variables by frequency of access with y being accessed together with a.t. In implementing the algorithm of this invention, structures are not broken up. Consequently, a.t. actually brings in all of a.

The whole order of the global variables based on the weighted interference graph of FIG. 7 is:

y→a.t. (1000)
x→z (100)
y→a.s. (100)
x→y (10)
z→a.t. (10)
y→z (1)
a.t.→a (1)

As the global variables are ordered, variable aggregates are built up (block 36). The first aggregate has y and a in it, and the ordering of the aggregate is significant because members which are most often accessed together can then share cache lines/pages within the aggregate.

Each of the nodes has a weight on it. The maximum permissible weight for any aggregate corresponds to the type of addressing used to access members of structures on the particular target machine. For example, if the target machine uses a relative base displacement load, then the maximum aggregate size is limited by the displacement field on the machine.

In respect of the example illustrated in FIG. 7, assume that the limit is 404. The first aggregate, that includes y and a, has a size of 136. The next edge selected (from the hierarchy) would bring the aggregates x and y together. However, the new total would exceed the size limitation. Therefore, just two aggregates are produced, and edges continue to be added to them.

Arrays are treated in a special manner according to the method of the present invention. The entire node size of the array need not be added to the aggregate this value can be added at the end. All that is required is a value enabling the caller to access the base of the array.

There is also a division between initialized and uninitialized external data because of the number of zeroes in the middle to the data.

There is also an issue on alignment requirements. The trade off is space versus locality. Following locality assignment, the variables are resorted into size classes. The reorganization provides that the largest are first (i.e. largest integers and structures, not arrays) to avoid sacrificing padded space.

Once some of the global variables have been remapped as members of global aggregates, these global variables can be explicitly placed in memory by the compiler through code optimization, independently of the linker mapping (block 38).

The embodiments of the invention in which an exclusive property or privilege is claimed are defined as follows:

We claim:

1. A method for optimizing a memory layout of program objects, comprising the computer implemented steps of:

weighting the access connections between the program objects and determining the cost of the program objects during complication;

building aggregates of the program objects for larger weighted connections before smaller weighted connections, limited by a maximum aggregate cost; and generating code to map the groups to memory;

whereby the code optimizes the memory layout of the program objects.

2. A method according to claim 1 wherein the step of generating code comprises generating code to map the groups to distributed memories.

3. A method for optimizing memory layout following complication, comprising the computer-implemented steps of:

defining a limit;

identifying a referenced program object;

building a weighted graph wherein weights on nodes represent program object size and weights on edges represent access relationships between nodes;

grouping the heaviest edges together from the weighted interference graph while the total weight of the nodes does not meet the limit; and remapping the program objects based on the grouping;

the remapping producing an optimized memory layout of the program objects.

4. A program storage device readable by a machine, tangibly embodying a program of instructions executable by the machine to perform method steps of optimizing memory layout following complication, said method steps comprising:

defining a limit;

identifying a referenced program object;

building a weighted graph wherein weights on nodes represent program object size and weights on edges represent access relationships between nodes;

grouping the heaviest edges together from the weighted interference graph while the total weight of the nodes does not meet a preset limit; and remapping the program objects based on the grouping.

* * * * *